United States Patent
Saenz et al.

(10) Patent No.: US 7,562,912 B2
(45) Date of Patent: Jul. 21, 2009

(54) DUCT MATING ASSEMBLY

(75) Inventors: N. Antonio Saenz, Belleville, MI (US); Samaneh Shahidehpour, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 260 days.

(21) Appl. No.: 11/349,435

(22) Filed: Feb. 7, 2006

(65) Prior Publication Data

US 2008/0012340 A1 Jan. 17, 2008

(51) Int. Cl.
*F16L 19/00* (2006.01)

(52) U.S. Cl. .................. 285/374; 285/424; 285/345; 454/162; 454/155

(58) Field of Classification Search .................. 285/424, 285/374, 345, 27, 24, 335, 231, 113, 332, 285/22, 339; 454/115, 162, 69, 155, 151
See application file for complete search history.

(56) References Cited

U.S. PATENT DOCUMENTS

| | | | |
|---|---|---|---|
| 2,302,397 A | 11/1942 | Spackman et al. | |
| 2,477,533 A * | 7/1949 | Whiting | 277/625 |
| 3,094,343 A * | 6/1963 | Wood | 285/113 |
| 3,327,603 A | 6/1967 | De Coye De Castelet | |
| 3,461,791 A | 8/1969 | Beyer | |
| 4,637,298 A | 1/1987 | Yoshikawa et al. | 98/2.08 |
| 5,907,134 A * | 5/1999 | Nording et al. | 181/228 |
| 6,210,265 B1 | 4/2001 | Arold | 454/152 |
| 6,468,148 B1 * | 10/2002 | Furusawa et al. | 454/164 |
| 6,589,110 B2 * | 7/2003 | Tanabe et al. | 454/155 |
| 6,688,653 B1 * | 2/2004 | Thrift et al. | 285/148.13 |
| 6,739,632 B1 * | 5/2004 | Thomas et al. | 285/339 |
| 6,808,451 B2 | 10/2004 | Luik et al. | 454/155 |
| 6,863,340 B2 | 3/2005 | Kawahigashi | 296/208 |
| 2003/0211821 A1 | 11/2003 | Driller | 454/124 |

FOREIGN PATENT DOCUMENTS

| | | |
|---|---|---|
| JP | 01164619 | 6/1989 |
| JP | 08028380 | 1/1996 |

* cited by examiner

*Primary Examiner*—David E Bochna
(74) *Attorney, Agent, or Firm*—Gifford, Krass, Sprinkle, Anderson & Citkowski, P.C.

(57) ABSTRACT

The duct mating assembly includes a first duct having connected side members that define an interior air space. The side members include inner and outer surfaces. The first duct extends from a first end to a second end and the first end is offset relative to the second end. A second duct includes connected side members that define an interior air space. The side members include inner and outer surfaces. The second duct terminates at a connection opening. The first and second ducts are operative to couple with each other. The first duct is positioned within the connection opening of the second duct when coupled thereby defining an air gap between the first and second ducts. At least one of the side members of the first duct includes a projection portion formed thereon. The projection portion extends outward a distance to create a uniform sized air gap between the first and second ducts.

5 Claims, 3 Drawing Sheets

DUCT MATING ASSEMBLY

FIELD OF THE INVENTION

The invention relates to air ducts, and more particularly to an air duct mating assembly.

BACKGROUND OF THE INVENTION

Air ducts are commonly utilized in a motor vehicle to transport air through a heating and cooling system and to circulate air within the compartment of a motor vehicle. Commonly, air ducts in a vehicle include many different components that must be assembled or connected together during an assembly of the vehicle. When mating various ducts, it is essential that they are aligned properly before being secured by a fastener or joining to assure that there are no air leaks within the ventilation system.

Generally, one duct is inserted within the other and then the ducts are joined or fastened together. However, this process usually involves a manual assembly of the ducts in which an operator must align the components together correctly before joining them. Such alignment and manipulation by an operator adds complication to the manufacturing process of the vehicle. There is therefore a need in the art for an improved duct mating assembly that allows for different ducts to be coupled in an efficient manner. There is also a need in the art for an improved duct mating assembly that assures that the ducts are aligned properly to prevent air leakage and is cost effective.

SUMMARY OF THE INVENTION

The duct mating assembly includes a first duct having connected side members that define an interior air space. The side members include inner and outer surfaces. The first duct extends from a first end to a second end and the first end is offset relative to the second end. A second duct includes connected side members that define an interior air space. The side members include inner and outer surfaces. The second duct terminates at a connection opening. The first and second ducts are operative to couple with each other. The first duct is positioned within the connection opening of the second duct when coupled thereby defining an air gap between the first and second ducts. At least one of the side members of the first duct includes a projection portion formed thereon. The projection portion extends outward a distance to create a uniform sized air gap between the first and second ducts.

DETAILED DESCRIPTION OF THE PREFERRED EMBODIMENTS

Figure 3:
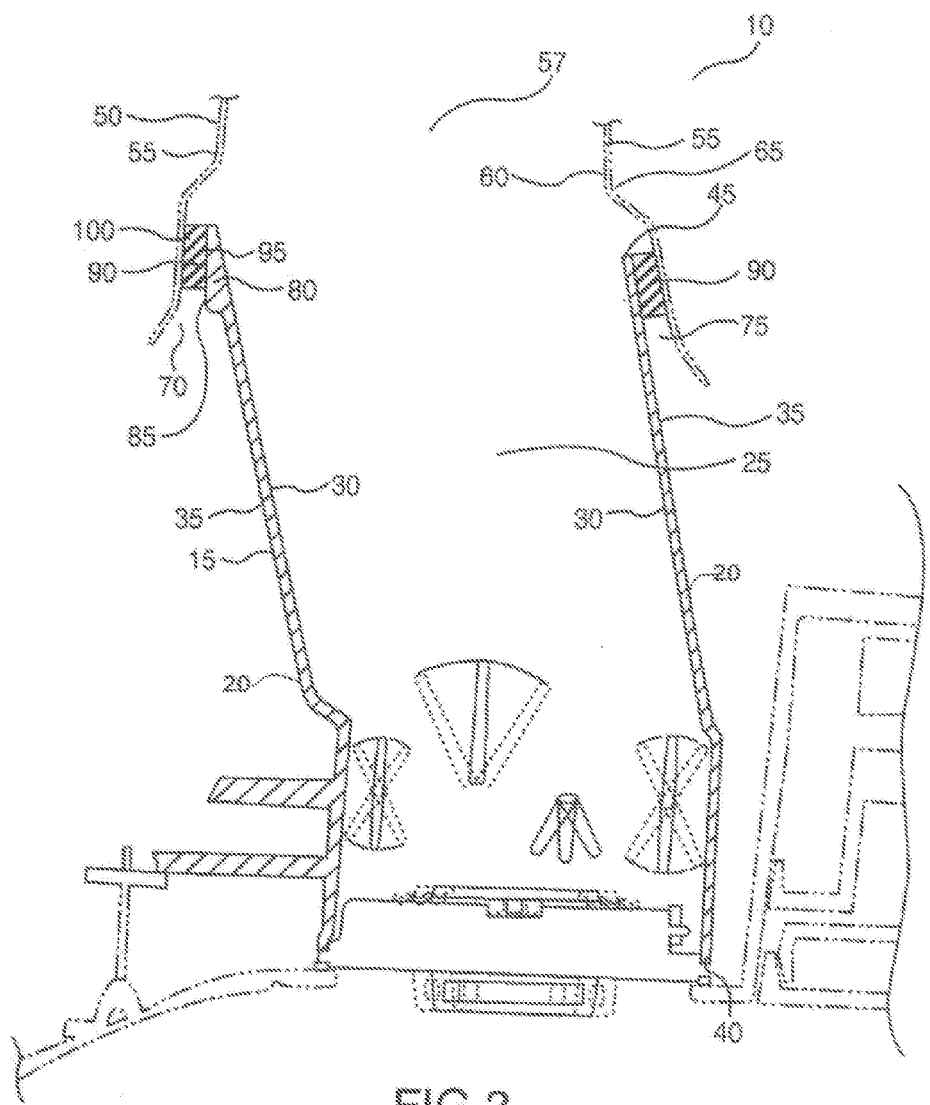
FIG. 3 is a sectional view of the first air duct coupled to a second air duct.

Referring to FIG. 3, there is shown a duct mating assembly 10 according to the present invention. As shown in FIG. 3, the duct mating assembly 10 includes a first duct 15 having connected side members 20 defining an interior air space 25. The side members 20 include inner and outer surfaces 30, 35. The first duct 15 extends from a first end 40 to a second end 45 with the first end 40 being offset relative to the second end 45.

Figure 1:
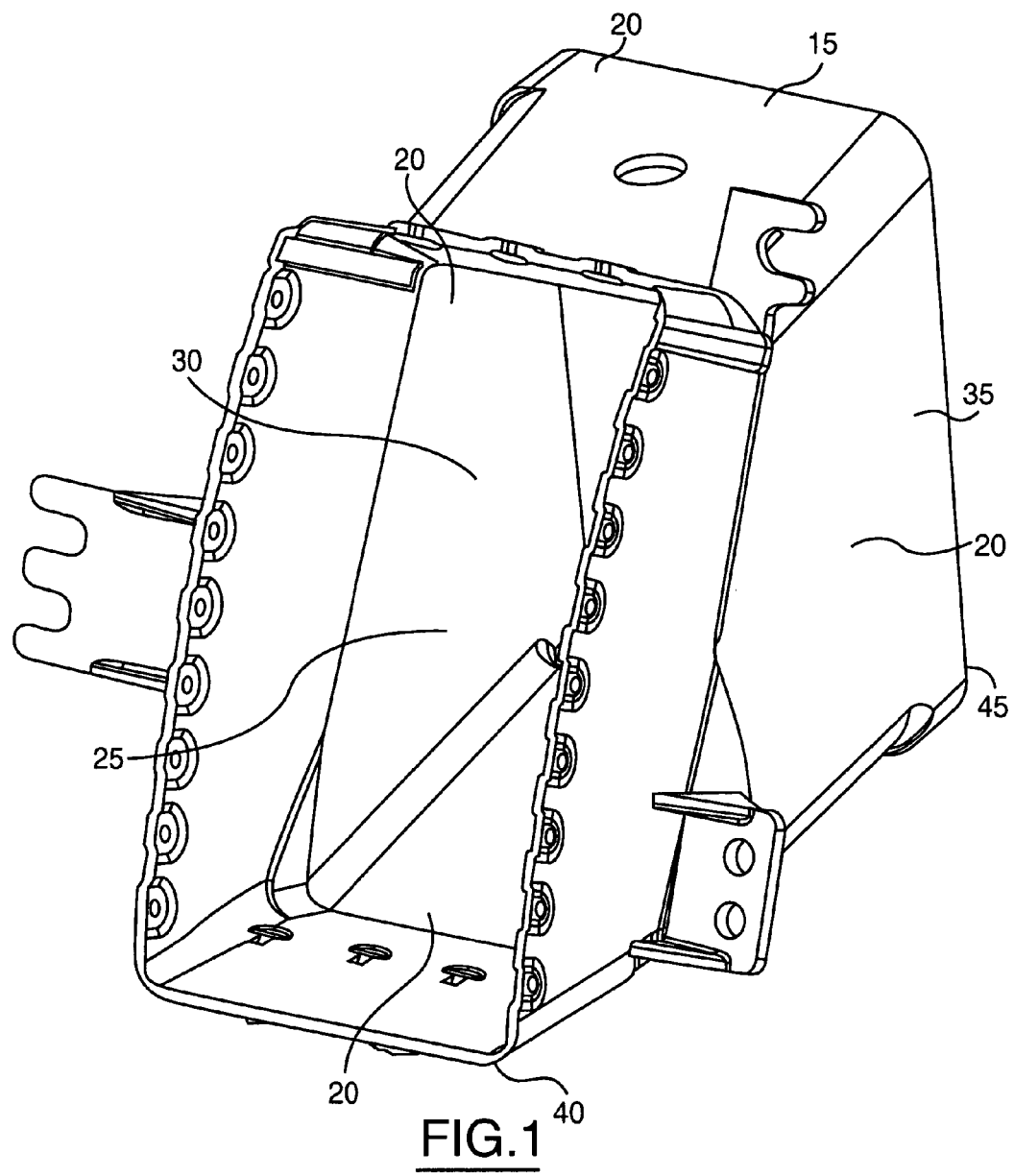
FIG. 1 is a perspective view of a first air duct used as a register coupling in a vehicle.
Figure 2:
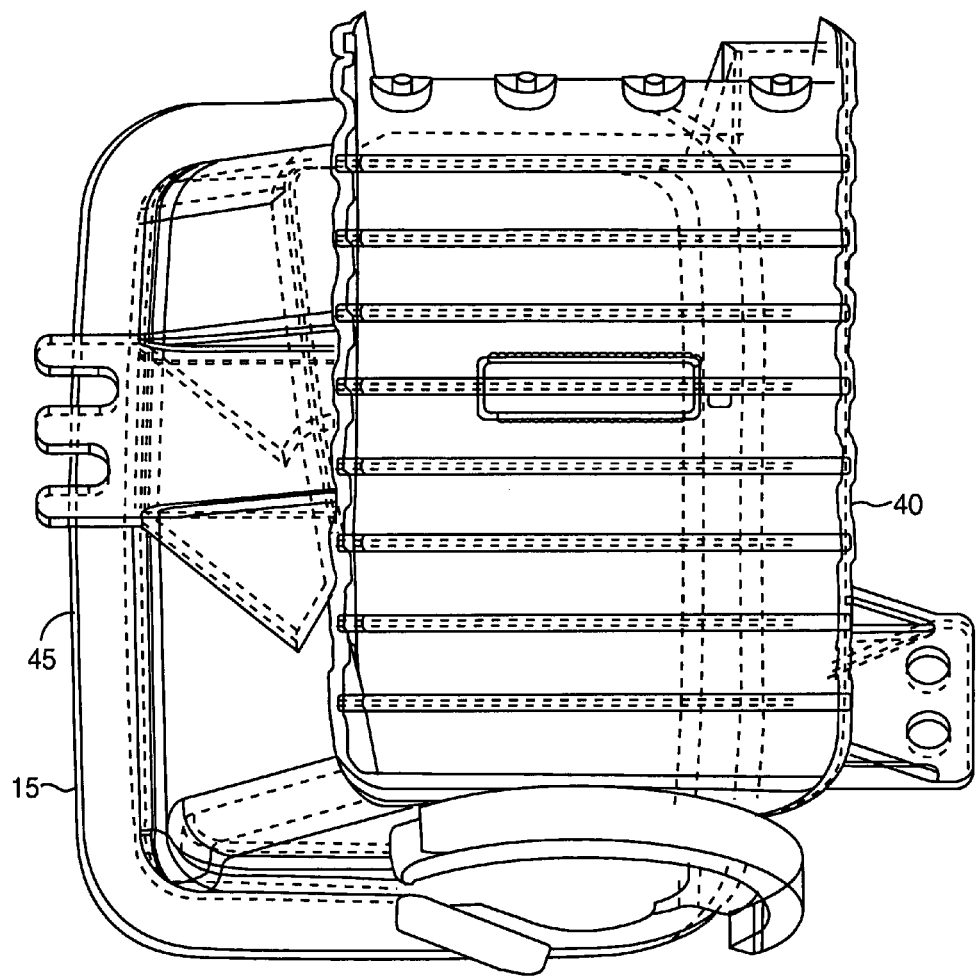
FIG. 2 is a front view of the first air duct of FIG. 1.

The first duct 15, as shown in FIG. 1, may be used to house a register on an instrument panel of a vehicle.

A second duct 50, as best shown in FIG. 3, includes connected side members 55 defining an interior air space 57. Again, the side members 55 include inner and outer surfaces 60, 65. The second duct 50 terminates at a connection opening 70, again as shown in FIG. 3.

The first and second ducts 15, 50 are operative to couple with each other. The first duct 15 is positioned within the connection opening 70 of the second duct 50 when coupled together, thereby defining an air gap 75 between the first and second ducts 15, 50. At least one of the side members 20 of the first duct 15 includes a projection portion 80 formed thereon. The projection portion 80 extends outward a distance to create a uniform sized air gap 75 between the first and second ducts 15, 50.

The projection portion 80 in one aspect of the invention includes an angled outer surface 85. The angled outer surface 85 is parallel to an opposing side member 55 of the second duct 50, as best shown in FIG. 3.

In another aspect of the invention, a foam member 90 is positioned in the air gap 75 defined by the first and second air ducts 15, 50. The foam member 90 includes inner and outer surfaces 95, 100. The outer surface 100 of the foam member 90 is positioned to contact the inner surface 60 of the side members 55 of the second duct 50 and the inner surface 95 of the foam member 90 is positioned to contact the outer surface 35 of the side members 20 of the first duct 15. The foam member 90 is preferably formed of a compressible and flexible material such that the foam member 90 is compressed between the first and second ducts 15, 50 when the first duct 15 is coupled to the second duct 50 to prevent air leakage between the first and second ducts 15, 50.

In one aspect of the invention, the foam member 90 may be attached to the first duct 15 and then inserted into the second duct 50 to couple the first and second ducts 15, 50. Additionally, fasteners may be utilized to further connect the first and second ducts 15, 50 through appropriate fastening points.

In another aspect of the invention, the foam member 90 is attached on the first duct 15 at a position corresponding to the projection portion 80. The foam member 90 is attached all the way around the entire outer surface 35 of the first duct 15. In this manner, the foam member 90 is positioned to contact the angled surface 85 of the projection member 80, as well as the opposing outer surface of the side member 20. In this manner, the foam member 90 is positioned such that it provides a uniform contact with the inner surface 60 of the second duct 50. In this manner, when the first duct 15 is inserted within the second duct 50 during an assembly process, the foam member 90 is compressed uniformly and provides a uniform sealing between the first and second ducts 15, 50 by filling the air gap 75 formed between the first and second ducts 15, 50.

The invention has been described in an illustrative manner. It is to be understood that the terminology which has been used is intended to be in the nature of words of description rather than limitation. Many modifications and variations of the invention are possible in light of the above teachings. Therefore, within the scope of the appended claims, the invention may be practiced other than as specifically described.

The invention claimed is:

1. An air duct mating assembly for a vehicle comprising:
a first duct having an air register portion, the first duct having connected side members defining an interior air space, the side members having inner and outer surfaces, the first duct extending from a first end to a second end, the first end offset relative to the second end;

a second duct having connected side members defining an interior air space, the side members having inner and outer surfaces, the second duct terminating at a connection opening;

the first and second ducts operative to couple with each other at an angle, wherein the first duct is positioned within the connection opening of the second duct when coupled defining a uniform air gap between the first and second ducts, and wherein at least one of the side members of the first duct includes a projection portion formed thereon, the projection portion extending outward a distance to create a uniform sized air gap between the fist and second ducts and wherein the projection portion includes an angled outer surface that is angled relative to an inner surface of the projection portion, the projection portion parallel to an opposing side surface of the second duct.

2. The duct mating assembly of claim 1 including a foam member positioned in the air gap defined by the first and second ducts.

3. The duct mating assembly of claim 2 wherein the foam member includes inner and outer surfaces, the outer surface of the foam member positioned to contact the inner surface of the side members of the second duct and the inner surface of the foam member positioned to contact the outer surface of the side members of die first duct.

4. The duct mating assembly of claim 2 wherein the foam member is adapted to compress when the first duct is coupled to the second duct for preventing air leakage.

5. The duct mating assembly of claim 2 wherein the foam member is attached to the first duct and then inserted into the second duct to couple the first and second ducts.

* * * * *

UNITED STATES PATENT AND TRADEMARK OFFICE
CERTIFICATE OF CORRECTION

| | |
|---|---|
| PATENT NO. | : 7,562,912 B2 |
| APPLICATION NO. | : 11/349435 |
| DATED | : July 21, 2009 |
| INVENTOR(S) | : N. Antonio Saenz et al. |

It is certified that error appears in the above-identified patent and that said Letters Patent is hereby corrected as shown below:

Column 3, line 12 replace "fist" with --first--

Column 4, line 9 replace "die" with --the--

Signed and Sealed this

Tenth Day of November, 2009

David J. Kappos
*Director of the United States Patent and Trademark Office*